US012715362B2

(12) United States Patent
Chen et al.

(10) Patent No.: US 12,715,362 B2
(45) Date of Patent: Aug. 25, 2026

(54) EDGE-ASSISTED OCCLUSION MITIGATION

(71) Applicant: TOYOTA MOTOR NORTH AMERICA, INC., Plano, TX (US)

(72) Inventors: Yitao Chen, Tempe, AZ (US); Dawei Chen, Milpitas, CA (US); Kyungtae Han, Palo Alto, CA (US); Onur Altintas, Sunnyvale, CA (US)

(73) Assignees: TOYOTA MOTOR NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 18/793,646

(22) Filed: Aug. 2, 2024

(65) Prior Publication Data

US 2026/0034938 A1 Feb. 5, 2026

(51) Int. Cl.

*B60R 1/23* (2022.01)
*G06T 11/00* (2026.01)
*G06T 19/00* (2011.01)
*G06V 10/764* (2022.01)
*G06V 20/58* (2022.01)

(52) U.S. Cl.

CPC ................ *B60R 1/23* (2022.01); *G06T 11/00* (2013.01); *G06T 19/006* (2013.01); *G06V 10/764* (2022.01); *G06V 20/58* (2022.01); *B60R 2300/802* (2013.01)

(58) Field of Classification Search

CPC .... B60R 1/23; B60R 2300/802; G06V 20/58; G06V 10/764; G06V 10/26; G06T 11/00; G06T 19/006

See application file for complete search history.

(56) References Cited

U.S. PATENT DOCUMENTS 6,115,651 A 9/2000 Cruz
9,802,540 B2 10/2017 Frommann
9,959,767 B1 * 5/2018 Canella .................. G08G 1/166
10,248,196 B2 4/2019 Sisbot
10,380,974 B2 8/2019 Wang
10,552,690 B2 * 2/2020 Schubert ................. G06T 11/00
10,981,507 B1 * 4/2021 Benjamin ................. B60R 1/24
11,394,949 B2 * 7/2022 Chapman ............... H04N 23/54

(Continued)

FOREIGN PATENT DOCUMENTS

WO 2018036250 A1 3/2018
WO 2023120988 A1 6/2023

*Primary Examiner* — Brian P Yenke

(74) *Attorney, Agent, or Firm* — SHEPPARD, MULLIN, RICHTER & HAMPTON LLP; Daniel N. Yannuzzi

(57) ABSTRACT

Systems and methods are provided for removing vehicle induced line-of-sight occlusions. Such systems and methods may comprise: (1) obtaining an image frame captured by an image sensor in a vehicle, the image frame comprising an object in an environment surrounding the vehicle; (2) detecting an occlusion event based on a vehicle structure occluding the object from an occupant of the vehicle; (3) modifying the image frame based on a metric of computation resources of the vehicle; (4) generating a data object representative of the occlusion event from the modified image frame; and (5) outputting the data object to a rendering device, wherein the rendering device renders a graphical visualization of the data object on a display viewable by the occupant of the vehicle.

20 Claims, 8 Drawing Sheets

(56) References Cited

U.S. PATENT DOCUMENTS

| | | | | |
|---|---|---|---|---|
| 11,738,741 | B2 | 8/2023 | Shalev-Shwartz | |
| 2007/0104272 | A1 | 5/2007 | He | |
| 2013/0063556 | A1 * | 3/2013 | Russell | G06T 7/194 348/E13.001 |
| 2014/0363045 | A1 * | 12/2014 | Wu | G06T 5/70 382/103 |
| 2017/0092234 | A1 * | 3/2017 | Watanabe | B60R 1/27 |
| 2017/0161950 | A1 * | 6/2017 | Seder | H04N 13/204 |
| 2017/0220887 | A1 * | 8/2017 | Fathi | G06T 7/55 |
| 2018/0114334 | A1 * | 4/2018 | Desai | G06V 10/82 |
| 2018/0249093 | A1 * | 8/2018 | Saeki | G06V 20/58 |
| 2019/0114921 | A1 * | 4/2019 | Cazzoli | G06V 20/58 |
| 2019/0272433 | A1 | 9/2019 | Yu | |
| 2019/0379841 | A1 * | 12/2019 | Hardy | B60K 35/80 |
| 2019/0379878 | A1 * | 12/2019 | Chapman | H04N 13/117 |
| 2020/0039435 | A1 * | 2/2020 | Chang | G06T 7/536 |
| 2020/0074735 | A1 * | 3/2020 | Nowakowski | G08G 1/22 |
| 2020/0396393 | A1 * | 12/2020 | Kauffmann | G06T 3/40 |
| 2021/0138960 | A1 * | 5/2021 | Benjamin | B60K 35/223 |
| 2021/0284069 | A1 * | 9/2021 | Shimanoki | B60K 35/23 |
| 2021/0380046 | A1 * | 12/2021 | Nagata | H04N 21/44008 |
| 2022/0067887 | A1 * | 3/2022 | Young | G06V 10/26 |
| 2022/0363194 | A1 * | 11/2022 | Windeler | H04N 7/181 |
| 2022/0363196 | A1 * | 11/2022 | van den Brink | B60R 99/00 |
| 2023/0107819 | A1 * | 4/2023 | Friedrichs | G06V 40/103 382/103 |
| 2023/0145016 | A1 * | 5/2023 | Chaturvedi | G06V 40/10 382/103 |
| 2023/0347826 | A1 * | 11/2023 | Almawashi | B60K 35/10 |
| 2023/0400321 | A1 * | 12/2023 | Lee | B60R 1/24 |
| 2024/0118394 | A1 * | 4/2024 | Tanaka | G01S 7/484 |

* cited by examiner

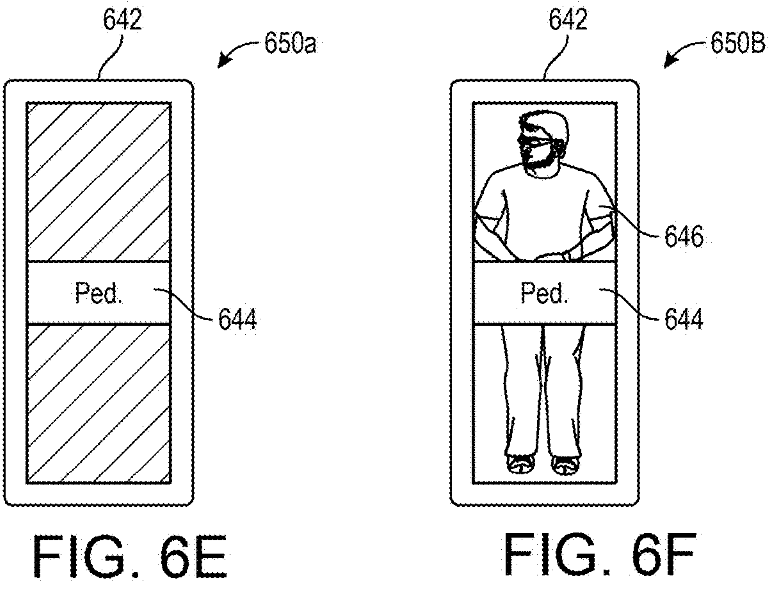
FIG. 6E
FIG. 6F
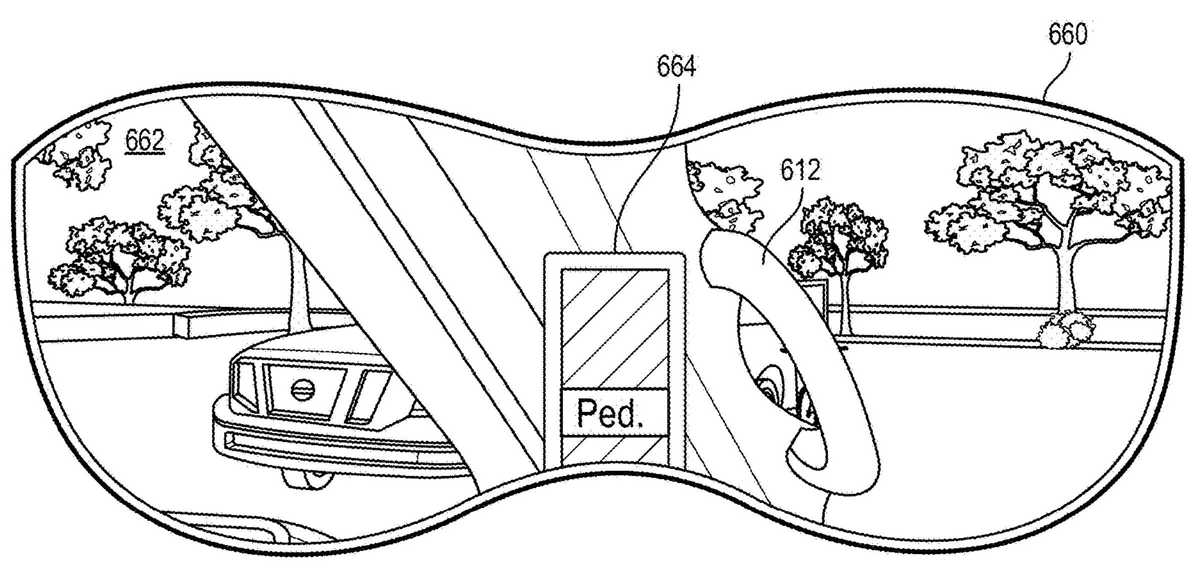
FIG. 6G

EDGE-ASSISTED OCCLUSION MITIGATION

TECHNICAL FIELD

The present disclosure relates generally to systems and methods for safe operation of a vehicle, and, more particularly, some embodiments relate to removal of vehicle induced line-of-sight occlusions of surrounding objects.

DESCRIPTION OF RELATED ART

Safety concerns due to operation of a vehicle have become increasingly worrisome. On such safety concern relates to blind spots that can inhibit a diver's ability to directly see surroundings while operating the vehicle. In various examples, blind spots can be formed by structures and/or components of a vehicle situated between the driver and surrounding objects along the driver's Line-of-Sight (LOS). The structures and/or components of a vehicle can block or otherwise occluded the driver's LoS, thereby inhibiting the driver's ability to visually perceive occluded objects. The structures and/or components of the vehicle can thusly create a blind spot, which can negatively impact the driver's ability to safely operate the vehicle.

BRIEF SUMMARY OF THE DISCLOSURE

According to various embodiments of the disclosed technology, systems and methods for mitigating occlusions are provided.

In accordance with some embodiments, a method for removing vehicle induced line-of-sight occlusions is provided. The method may comprise: (1) obtaining an image frame captured by an image sensor in a vehicle, the image frame comprising an object in an environment surrounding the vehicle; (2) detecting an occlusion event based on a vehicle structure occluding the object from an occupant of the vehicle; (3) modifying the image frame based on a metric of computation resources of the vehicle; (4) generating a data object representative of the occlusion event from the modified image frame; and (5) outputting the data object to a rendering device, wherein the rendering device renders a graphical visualization of the data object on a display viewable by the occupant of the vehicle.

In certain embodiments of the method, detecting an occlusion event based on the vehicle occluding the object from an occupant of the vehicle may comprise: (a) estimating a region of the image frame occluded by the vehicle; (b) detecting the object in the image frame using an object detection algorithm; and (c) determining that the detected object at least partially overlaps with the estimated region. Here, detecting the occlusion event may be responsive to the determination that the detected object at least partially overlaps with the estimated region. In some of such embodiments, estimating the region of the image frame occluded by the vehicle may be based on dimensions of a vehicle structure of the vehicle, a position of the occupant within the vehicle, and an orientation of the image sensor.

In some embodiments of the method, the object may be occluded by a vehicle structure comprising at least one of: an A pillar of the vehicle, a B pillar of the vehicle, a C pillar of the vehicle, a side-mirror of the vehicle, a rear-view mirror, or sun visor.

In various embodiments of the method, modifying the image frame may be responsive to detecting the occlusion event.

In certain embodiments of the method, the method may further comprise dynamically selecting a magnitude of modification based on evaluating the metric of the computation resources. Here, modifying the image frame may be based on the selected magnitude of the modification.

In some embodiments of the method, generating the data object representative of the occlusion event may comprise: (a) extracting a graphical element representative of the object from the modified image frame; and (b) generating a label for the object by applying a machine learning (ML) object recognition algorithm trained to classify objects and generate labels based on the classifications. Here, the data object may comprise the graphical element and the label. In certain of such embodiments, the graphical element may comprise a bounding box corresponding to the object. In various embodiments, the rendering device may comprise an augmented reality (AR) device configured to render the graphical visualization of the data object by superimposing the graphical element and the label over a real-world view on a display interface of the AR device.

In another aspect, an edge device is provided that comprises: (1) a communication circuit configured to exchange communications with a rendering device; (2) a memory storing instructions; and (3) one or more processors communicably coupled to the memory and configured to execute the instructions to: (a) obtain an image frame captured by an image sensor in a vehicle, the image frame comprising an object in an environment surrounding the vehicle; (b) detect that the object is occluded from an occupant of the vehicle by a structure of the vehicle; (c) modify the image frame based on a metric of computation resources of the vehicle; (d) generate a data object representative of the occluded object from the modified image frame; and (e) transmit the data object to a rendering device via the communication circuit, wherein the rendering device renders a graphical visualization of the data object on a display viewable by the occupant of the vehicle.

In certain embodiments of the edge device, detecting that the object is occluded from an occupant of the vehicle may comprise: (i) estimating an occluded region of the image frame based on the structure of vehicle; and (ii) detecting that the object at least partially overlaps with the occluded region, wherein detecting that the object is occluded is responsive to the detection that the object at least partially overlaps with the occluded region. In some of such embodiments, estimating the occluded region may be based on dimensions of a vehicle structure of the vehicle, a position of the occupant within the vehicle, and an orientation of the image sensor.

In various embodiments of the edge device, the structure of the vehicle may comprise at least one of: an A pillar of the vehicle, a B pillar of the vehicle, a C pillar of the vehicle, or a side-mirror of the vehicle.

In certain embodiments of the edge device, modifying the image frame may be responsive to detecting the occlusion event.

In some embodiments of the edge device, the one or more processors may be further configured to execute the instructions to dynamically select a magnitude of modification based on evaluating the metric of the computation resources, wherein modifying the image frame is based on the selected magnitude of the modification.

In various embodiments of the edge device, generating the data object representative of the occluded object may comprise: (i) extracting a graphical element of the object from the modified image frame; and (ii) generating a label for the object by applying a machine learning (ML) object recognition algorithm trained to classify objects and generate labels based on the classifications, wherein the data object comprises the graphical element and the label. In certain of such embodiments, the graphical element may comprise a bounding box corresponding to the object. In some embodiments, the rendering device may comprise an augmented reality (AR) device configured to render the graphical visualization of the data object by superimposing the graphical element and the label over a real-world view on a display interface of the AR device.

In some embodiments of the edge device, the edge device is the vehicle.

In certain embodiments of the edge device, the image sensor is mounted on an exterior facing surface of the structure of the vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 6E and 6F depict example data objects that can be extracted from the image frame of FIG. 6D in accordance with one described herein.

FIG. 6G illustrates an example of graphical visualization overlaid on a real-world view using a rendering device in accordance with one described herein.

Figure 1:
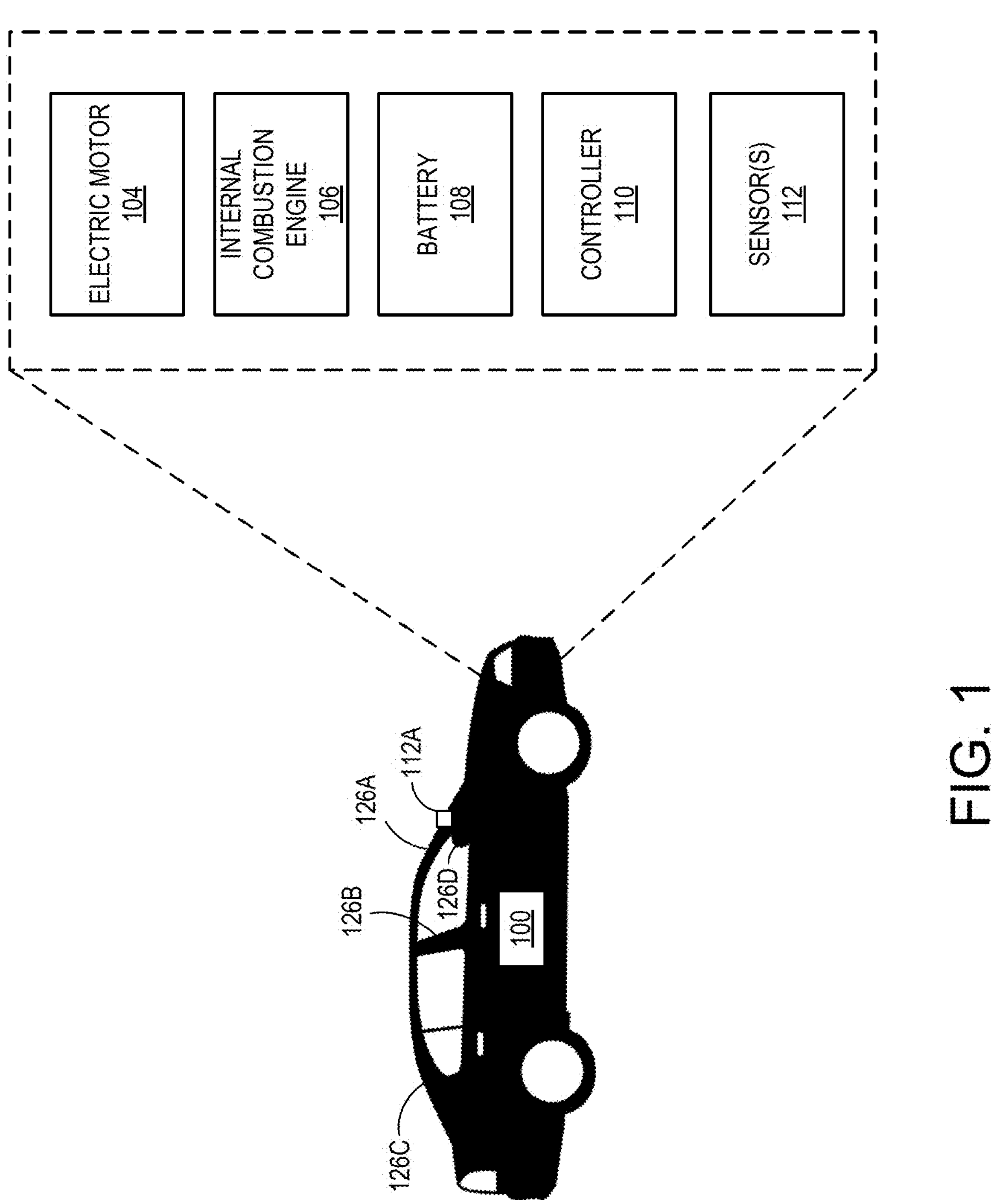
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

As alluded to above, structures and/or components of a vehicle (referred to herein as "vehicle structures") can create blind spots by occluding objects situated along a driver's LoS. Aspects of the disclosed technology provide for mitigating such LoS occlusions by detecting occlusion events in which one or more objects are occluded, from the perspective of a driver of the vehicle, due to vehicle structures. Aspects of the technology disclosed herein, based on the detected occlusion event, generate a graphical visualization on a display interface that is representative of the occluded objects. The driver is thusly able to visually perceive the occluded objects via the display interface.

Aspects of the disclosed technology may utilize one or more image sensors (e.g., cameras or the like) installed on the vehicle and configured obtain one or more image frames or a sequence of one or more image frames (e.g., video) of an environment surrounding the vehicle. The environment can include numerous objects, such as, but not limited to, pedestrian, bicyclist, other vehicles, and so on. Objects may also include roadway infrastructure, such as signage, traffic lights, construction markers, and other roadway obstacles. In some examples, the one or more image sensors may be configured to capture image frames of a region of the environment corresponding to a vehicle structure induced blind spot (e.g., a region of the environment occluded from the view of the driver in a cabin of the vehicle).

Aspects of the disclosed technology can process the one or more image frames to detect an occlusion event in which an object, contained in the image frames, would be occluded from the driver's (or other occupant of the vehicle) LoS. Occlusions events may inhibit the driver's ability to perceive the occluded objects, which pose safety concerns during vehicle operation. In an example, the disclosed technology may identify an occurrence of an occlusion event by performing a projection-based occlusion estimation that estimates a region of the one or more image frames that corresponds to a region that would be occluded by the vehicle structure (referred to as an occluded region) from the view point of the driver. Using the occluded region, projection-based occlusion estimation can then detect an intersection or overlap between objects in the one or more images and the occluded region. In examples, estimating the occluded region may include generating a projection of one or more vehicle structures on the one or more image frames. Embodiment herein can detect an intersection or overlap between objects contained in the one or more image frames and the projection of the vehicle structures.

In an illustrative example, A pillars may be a vehicle structure that can occlude objects along a driver's LoS. A pillars are vertical or inclined structures at or near the front corner of a cabin of the vehicle that support the roof of the vehicle. A pillars, either on the driver or passenger side of the front of the cabin, may cause occlusion events by forming blind spots along the LoS of the driver. Aspects of the disclosed technology may obtain specifications defining the physical structure (e.g., dimensions) of the A pillars, which can be used to generate a projection of the A pillar onto the one or more image frames corresponding to a region that would be occluded from the perspective of the driver. Aspects of the disclosed technology may execute an object detection algorithm configured to detect objects in the one or more image frames and track the detected objects through the image the frames. Aspects of the disclosed technology can recognize an occlusion event in the event that a detected object enters (e.g., intersects with and/or overlaps) with the projection of the A pillar and tag the object as an occluded object.

While the above example is described with reference to an A pillar, the technology disclosed herein is not to be limited to A pillars. The technology disclosed herein can be implemented for any vehicle structure (e.g., driver side/passenger side A pillars, driver side/passenger side B pillars, driver side/passenger side C pillars, driver side/passenger side side-view mirrors, rear-view mirrors, sun visors, etc.).

Based on (e.g., in response to) detecting an occlusion event, aspects of the disclosed technology may process the one or more image frames to classify the occluded objects and generate a data object corresponding to the occluded objects. The data objects may be provided to a rendering device for rendering on a display interface thereof. Aspects of the disclosed technology may utilize known object recognition machine learning (ML) algorithms trained to recognize objects from image frames, classify the recognized objects, and generate a label for the classification, which can then be associated (e.g., included in metadata) with the graphical element representative of the occluded object. For example, object recognition algorithms can classify an occluded object as a pedestrian, a bicyclists, another vehicle, traffic signal/signage, etc. and generate a corresponding label. Once classified, the embodiments disclosed herein may construct a data object for the occluded objects by extracting a graphical element representative of the occluded object and associating the label generated by the object recognition algorithm with the graphical element. In some examples, the graphical element may be an icon or other visual element that is intended to represent the occluded object in a graphical visualization. In some examples, the object recognition algorithm (and/or object detection algorithm) may generate a bounding box that can be superimposed over the occluded object. This bounding box may be output as the graphical element. In yet another example, the object itself may be extracted from the one or more image frames and output as the graphical element, with or without a bounding box.

Aspects of the disclosed technology may be configured to output the data object to a rendering device configured to render the data object on a display interface viewable by the driver. In some examples, rendering the data object may include generating a graphical visualization of the graphical element and label that is superimposed (e.g., overlaid) on a real-world view of the environment. For example, the rendering device according to some embodiments may be an augmented reality (AR) device that can render the data object, as digital content, onto a real-world view of environment surrounding the vehicle. In this case, the real-world view may be from the view point of the driver, which may include visually perceiving the vehicle structure that induced the occlusion detected above. The data object may thusly be overlaid on this real-world view, for example, overlaid on the vehicle structure in the real-world view. As a result, the driver can be notified of an object that is otherwise occluded and is able to perceive the location of this occluded object.

In some examples, the rendering device may be wearable AR device, such as AR glasses worn by the driver. In this case, the AR glasses may permit the driver to view the real-world environment as perceived by the driver's eyes, while the AR glasses renders the data object on a display interface (e.g., a display interface integrated in the eye lens) of the AR glasses, thereby overlaying the data object on the real-world environment. In another example, the rendering device may be an in-cabin display interface (e.g., a heads-up display, dashboard display, center console display, mobile phone, or the like).

In examples, the ML algorithms (e.g., the object recognition algorithm) may be executed by an edge device, such as the vehicle itself or a roadside unit of a roadway infrastructure. Edge devices may have limited computation resources, some which may be dedicated to other tasks, such as but not limited to, vehicle operation, audio systems, infotainment systems, autonomous systems, etc. in the case of a vehicle; or traffic flow management, safety monitoring, etc., in the case of a roadside unit. Object recognition and classification tasks, through numerous image frames, can be taxing on computation resources, particularly in cases where there are numerous image sensors providing image frames of high resolution or complex features (e.g., larger file sizes). Additionally, executing ML algorithms on larger files sizes can be computationally complex, resulting in processing delays. These delays can inhibit real-world applications, which may rely on real-time processing of the images to give an up-to-date representation of any occluded objects. Processing delays that result in sub-real-time image processing and rendering of occluded objects can increase vehicle safety concerns as drivers may not be notified of occluded objects, in real-time, necessary for safe operation of the vehicle (e.g., avoiding collisions with occluded objects). Furthermore, user adoption with occlusion detections can be inhibitive where the presented information is delayed.

Accordingly, embodiment disclosed herein can be configured to modify the one or more images based a metric of computation resources of the edge device (e.g., vehicle, roadside unit, or other edge device) implemented for executing the ML algorithms. Modifying the one or more images may include resizing the one or more images to generate a smaller file size. For example, the resolution of the one or more images may be reduced to generate a smaller data size that the edge device can efficiently apply the ML algorithm in real-time. In another example, modifying the one or more images may comprise removing or otherwise deleting unnecessary metadata or image data. For example, RGB image frames may be obtained by the image sensor, which can be converted to grayscale or black-and-white to reduce the data size by removing certain pixel data. Other techniques may be used to modify the image frames to reduce the file size.

The metric of the computation resources, in some examples, can comprise a computation resource score representative of a measure of total computation resources of the image processing device. For example, in the case of a vehicle, the vehicle may be preconfigured with certain computation resources, such as but not limited to, total amount of processing power, a total amount of memory, computing components (e.g., GPU, CPU, etc.), and so on that define the total computation resources of the vehicle. Each computation resource can be allocated a value corresponding to an amount of each respective resource (e.g., larger values allocated to larger amounts of resources). A weight may be applied to each value and the weighted values may be aggregated to provide the computation resource score. In some examples, the computation resource score may be known in advance and stored in a cloud-database, which can be communicated to the vehicle. In some examples, the metric of computation resources may include an available computation resource score, for example, by obtaining the computation resource score and computing a score of computation resource committed to other tasks (referred to herein as committed resource score). The committed resource score can be subtracted from the computation resource score to determine the available computation resource score (e.g., computation resources that are uncommitted to other tasks).

Aspects of the disclosed technology may evaluate the metric and modify the one or more image frames based on the evaluation. For example, as noted above, computation resource scores can be determined in advance for a given edge device (e.g., a given vehicle) based on the computation resources installed therein. Once a metric is obtained, the magnitude of the modification applied to the image frames may be determined based on the metric so to ensure real-time image processing (e.g., recognition and classification) and data object rendering. In examples, processing the image frames in real-time may be include, for example, processing, by the object recognition algorithm, each image frame having a occlusion event therein and outputting a data object for each occluded object within a set amount time. The set amount of time may be, for example, 30 milliseconds or less. In some examples, the set amount of time may be 16 milliseconds or less. Any set amount of time may be selected, such that there is negligible delay (e.g., no perceivable delay by the driver of the vehicle) between obtaining the one or more image frames and rendering data objects by the rendering device.

Aspects of the disclosed technology may determine whether to apply a capability-aware image modification or a default image modification. For example, as noted above, computation resource scores can be determined in advance for a given edge device based on the computation resource installed therein. However, if the edge device is new or otherwise unknown, a computation resource score for that edge device may not be available. Thus, responsive to a query for a computation resource score, the edge device may be receive a notification that there is no computation resource score, a zero value for the score, or a NULL. Based on this notification, embodiments disclosed herein may apply default image modification to the one or more image frames. The default image modification may be set in advance and selected to ensure that processing of the image frames can be achieved in real-time irrespective of the computation resources of the edge device. In some examples, default image modification may be implemented as a fixed-ratio resizing of the one or more images, where "fixed-ratio" refers to ratio that is common across edge devices having a common day level of computation resources so to achieve real-time processing. In an example, the fixed-ratio resizing may be set to 20:1, but other any ratio as desired may be implemented. Whereas, if a metric is available for the vehicle, embodiments disclosed herein apply the capability-aware image modification, which uses the metric of the computation resources to dynamically select a magnitude of the modification (e.g., a dynamic ratio).

The systems and methods disclosed herein may be implemented with any of a number of different edge devices. For example, the systems and methods disclosed herein may be used with any vehicle or vehicle type, such as but not limited to, automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for mitigating occlusions can be implemented in other types of vehicle including gasoline- or diesel-powered vehicles, fuel-cell vehicles, electric vehicles, or other vehicles.

FIG. 1 illustrates a drive system of a vehicle 100 that may include an internal combustion engine 106 one or more electric motors 104 (which may also serve as generators) or a combination thereof as sources of motive power. Driving force generated by the internal combustion engine 106 and electric motors 104 can be transmitted to one or more wheels of the vehicle to move the vehicle.

Internal combustion engine 106 may include, for example, a gasoline, diesel or similarly powered engine in which fuel is injected into and combusted in a combustion chamber. Electric motor 104 can also be used to provide motive power in vehicle 100 and is powered electrically via a battery 108. Battery 108 may be implemented as one or more batteries or other power storage devices including, for example, lead-acid batteries, lithium ion batteries, capacitive storage devices, and so on. Battery 108 may be charged by connection to an AC mains supply or by a battery charger that receives energy from internal combustion engine 106. For example, an alternator or generator may be coupled directly or indirectly to a drive shaft of internal combustion engine 106 to generate an electrical current as a result of the operation of internal combustion engine 106. A clutch can be included to engage/disengage the battery charger. Battery 108 may also be charged by electric motor 104 such as, for example, by regenerative braking or by coasting during which time electric motor 104 operate as generator.

Electric motor 104 can be powered by battery 108 to generate a motive force to move the vehicle and adjust vehicle speed. Electric motor 104 can also function as a generator to generate electrical power such as, for example, when coasting or braking. Battery 108 may also be used to power other electrical or electronic systems in the vehicle. Electric motor 104 may be connected to battery 108 via an inverter 42. Battery 108 can include, for example, one or more batteries, capacitive storage units, or other storage reservoirs suitable for storing electrical energy that can be used to power electric motor 104. When battery 108 is implemented using one or more batteries, the batteries can include, for example, nickel metal hydride batteries, lithium ion batteries, lead acid batteries, nickel cadmium batteries, lithium ion polymer batteries, and other types of batteries.

A controller 110 (e.g., an electronic control unit (ECU)) may be included and may control the electric drive components of the vehicle as well as other vehicle components. For example, controller 110 may adjust driving current supplied to electric motor 104, and adjust the current received from electric motor 104 during regenerative coasting and braking. As a more particular example, output torque of the electric motor 104 can be increased or decreased by controller 110 through an inverter.

Controller 110 may include, for example, a microcomputer that includes a one or more processing units (e.g., microprocessors), memory storage (e.g., RAM, ROM, etc.), and I/O devices. The processing units of controller 110, execute instructions stored in memory to control one or more electrical systems or subsystems in the vehicle. Controller 110 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, controller 110 receives information from a plurality of sensors 112 included in vehicle 102. For example, controller 110 may receive signals that indicate vehicle operating conditions or characteristics, or signals that can be used to derive vehicle operating conditions or characteristics. These may include, but are not limited to accelerator operation amount, a revolution speed of internal combustion engine 106 (engine RPM), a rotational speed of the electric motor 104 (motor rotational speed), vehicle speed, roll, pitch and yaw of the vehicle, lateral acceleration, wheel spin, torque converter output (e.g., output amps indicative of motor output), brake operation amount/pressure, battery SOC (i.e., the charged amount for battery 108 detected by an SOC sensor), and other sensors. Accordingly, vehicle 102 can include a plurality of sensors 112 that can be used to detect various conditions internal or external to the vehicle and provide sensed conditions to other systems including driver training system 114.

In some embodiments, one or more of the sensors 112 may include their own processing capability to compute the results for additional information that can be provided to controller 110. For example, sensors 112 may include image sensors that include processing capability to execute object detection and tracking algorithms. In other embodiments, one or more sensors may be data-gathering-only sensors that provide only raw data to controller 110. In further embodiments, hybrid sensors may be included that provide a combination of raw data and processed data to controller 110. Sensors 112 may provide an analog output or a digital output.

Sensors 112 may be included to detect not only vehicle conditions but also to detect external conditions as well. For example, sensors 112 may include exterior-facing image sensors that might be used to detect external conditions in an environment surrounding vehicle 100. Image sensors may be implemented as, for example, sonar, radar, lidar, camera, or other vehicle proximity sensors. Image sensors or other proximity sensors can be used to detect roadway objects in an environment surrounding vehicle 100, for example, traffic signals, traffic signs indicating a current speed limit, road curvature, obstacles, pedestrians, bicyclist, other vehicles, and so on. While some sensors can be used to actively detect passive environmental objects, other sensors can be included and used to detect active objects such as those objects used to implement smart roadways that may actively transmit and/or receive data or other information.

FIG. 1 also depicts a diagram of example vehicle structures of a vehicle 100 according to example implementation of the present disclosure. With reference to FIG. 1, vehicle 100 can include various types of vehicle structures, e.g. A pillars 126A, B pillars 126B, C pillars 126C, and side-view mirrors 126D (collectively referred to herein as vehicle structures 126). Although FIG. 1 only shows the vehicle structures 126 on the left side of vehicle 100, those skilled in the art should understand that vehicle structures 126 can also be disposed on the right side at locations corresponding to those on the left side. As outlined above, any one of (or a combination of) vehicle structures 126 may cause blind spot, for example, by occluding a region of the exterior environment along the driver's LoS. For example, the A pillar 126A and/or the side-view mirror 126D on the left side may occlude objects along the driver's LoS during a left hand turn. As another example, the C pillar 126C may occlude objects along a drivers LoS during a backing up maneuver. Hereafter, the system and method in the present disclosure will be introduced only with A pillars taken as an example; however, those skilled in the art will appreciate that the examples disclosed herein can be applied to any vehicle structures.

In the illustrative example of FIG. 1, sensors 112 includes exterior-facing image sensor 112A that is positioned or otherwise mounted on the exterior of vehicle 100 or otherwise configured to capture image frames an environment exterior to the vehicle 100. In the example of FIG. 1, image sensor 112A is illustratively mounted on A pillar 126A and aligned to capture image frames of an area external to the vehicle 100 that could be occluded by the A pillar 126A. Hereafter, the system and method in the present disclosure will be introduced reference with image sensor 116A taken as an example; however, those skilled in the art will appreciate that the examples disclosed herein can be applied to image sensors installed at any location of the vehicle so to capture external conditions that could be occluded by any vehicle structure (e.g., B pillar 126B, C pillar 126C, side-view mirror 126D, rear-view mirror, sun-visor, etc.).

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
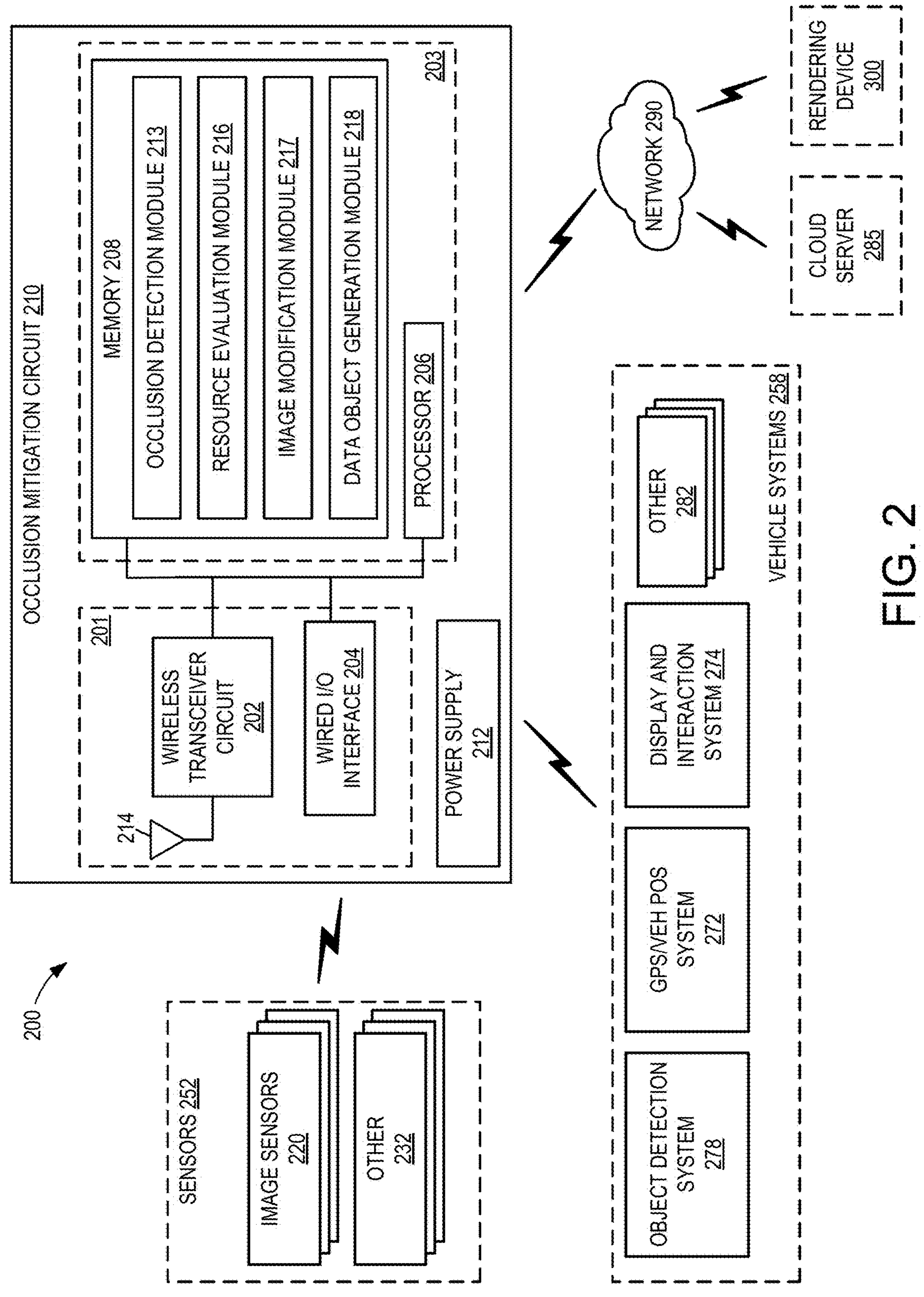
FIG. 2 illustrates an example architecture for mitigating occlusions in accordance with one embodiment of the systems and methods described herein.

FIG. 2 illustrates an example architecture for mitigating occlusions in accordance with one embodiment of the systems and methods described herein. Referring now to FIG. 2, in this example, occlusion mitigation system 200 includes a occlusion mitigation circuit 210, a plurality of sensors 252 and a plurality of vehicle systems 258. Sensors 252 (such as sensors 112 described in connection with FIG. 1) and vehicle systems 258 can communicate with occlusion mitigation circuit 210 via a wired or wireless communication interface. Although sensors 252 and vehicle systems 258 are depicted as communicating with occlusion mitigation circuit 210, they can also communicate with each other as well as with other vehicle systems. In some examples, occlusion mitigation circuit 210 can be implemented as an ECU or as part of an ECU such as, for example controller 110. In other embodiments, occlusion mitigation circuit 210 can be implemented independently of the ECU. In yet other examples, occlusion mitigation circuit 210 may be implemented as part of any edge device communicating with sensors 252 and/or vehicle systems 258 (e.g., a roadside unit or the like).

Occlusion mitigation circuit 210 in this example includes a communication circuit 201, a decision circuit 203 (including a processor 206 and memory 208 in this example) and a power supply 212. Components of occlusion mitigation circuit 210 are illustrated as communicating with each other via a data bus, although other communication in interfaces can be included. Occlusion mitigation circuit 210 in this example also can be operated to connect to a cloud server 285 over network 290 to obtain a computation resource score for the occlusion mitigation circuit 210. For example, occlusion mitigation circuit 210 may download a computation resource score from the cloud server 285 via communication circuit 201. In some examples, occlusion mitigation circuit 210 may also download vehicle specifications, such as physical dimensions of vehicle structures.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store instructions and variables for processor 206 as well as any other suitable information, such as, one or more of the following elements: metrics of computation resources of the occlusion mitigation circuit 210, including a computation resource score, a committed resource score, and available computation resource score; image frames; object classifications and labels; data objects that can be rendered on a display interface; vehicle specifications, such as physical dimensions of vehicle structures; and etc. Memory 208 can be made up of one or more modules of one or more different types of memory, and may be configured to store data and other information as well as operational instructions that may be used by the processor 206 to occlusion mitigation circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a occlusion mitigation circuit 210.

Communication circuit 201 includes either or both a wireless transceiver circuit 202 with an associated antenna 214 and a wired I/O interface 204 with an associated hardwired data port (not illustrated). Communication circuit 201 can provide for vehicle-to-everything (V2X) and/or vehicle-to-vehicle (V2V) communications capabilities, allowing occlusion mitigation circuit 210 to communicate with edge devices, such as roadside unit/equipment (RSU/RSE), network cloud servers and cloud-based databases, rendering devices 300, and/or other vehicles via network 290. For example, V2X communication capabilities allows occlusion mitigation circuit 210 to communicate with cloud servers, roadside infrastructure (e.g., such as roadside equipment/roadside unit, which may be a vehicle-to-infrastructure (V2I)-enabled street light or cameras, for example), rendering device 300, etc.

As this example illustrates, communications with occlusion mitigation circuit 210 can include either or both wired and wireless communications circuits 201. Wireless transceiver circuit 202 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by occlusion mitigation circuit 210 to/from other entities such as sensors 252 and vehicle systems 258.

Wired I/O interface 204 can include a transmitter and a receiver (not shown) for hardwired communications with other devices. For example, wired I/O interface 204 can provide a hardwired interface to other components, including sensors 252 and vehicle systems 258. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 252 can include, for example, sensors 112 such as those described above with reference to the example of FIG. 1. Sensors 252 can include additional sensors that may or may not otherwise be included on a standard vehicle with which the occlusion mitigation system 200 is implemented. In the illustrated example, sensors 252 includes image sensors 220. These may include interior facing sensors, exterior facing image sensors, front facing image sensors (e.g., image sensors 112A), side facing image sensors, and/or rear facing image sensors. Image sensors may capture information which may be used in detecting not only vehicle conditions but also detecting conditions external to the vehicle (e.g., surrounding environment) as well. Image sensors that might be used to detect external conditions can include, for example, cameras or other image sensors configured to capture data in the form of sequential image frames forming a video in the visible spectrum, near infrared (IR) spectrum, IR spectrum, ultra violet spectrum, etc. Image sensors 260 can be used to, for example, to detect objects in an environment surrounding the vehicle, for example, surrounding vehicles, roadway environment, road lanes, road curvature, pedestrians, bicyclists, other obstacles, and so on. Object detection and object recognition techniques may be used to detect, track and classify objects contained in image frames. Additional sensors 232 can also be included as may be appropriate for a given implementation of occlusion mitigation system 200, such as, but not limited to, vehicle acceleration sensors, vehicle speed sensors, accelerometers to detect roll, pitch and yaw of the vehicle, environmental sensors (e.g., to detect salinity or other environmental conditions), and proximity sensor.

In some embodiments, image sensors 220 may include their own processing capability to compute the results for additional information that can be provided to occlusion mitigation circuit 210. For example, image sensors 220 may include processing capability to execute object detection and tracking algorithms on image frames captured by a respective image sensor. In other embodiments, one or more sensors may be data-gathering-only sensors that provide only raw data to occlusion mitigation circuit 210. In further embodiments, hybrid sensors may be included that provide a combination of raw data and processed data to occlusion mitigation circuit 210.

Vehicle systems 258 can include any of a number of different vehicle components or subsystems used to control or monitor various aspects of the vehicle and its performance. In this example, the vehicle systems 258 includes a vehicle positioning system 272; vehicle display and interaction system 274 (e.g., vehicle audio system for broadcasting notifications over one or more vehicle speakers, vehicle display system, the vehicle dashboard system, infotainment system, etc.); object detection system 278 to perform image processing such as object detection and recognition on images frames captured by image sensors 220; and other vehicle systems 282 (e.g., engine control circuits to control the operation of engine; Advanced Driver-Assistance Systems (ADAS); autonomous or semi-autonomous driving systems, such as forward/rear collision detection and warning systems, pedestrian detection systems, autonomous or semi-autonomous driving systems, and the like).

Network 290 may be a conventional type of network, wired or wireless, and may have numerous different configurations including a star configuration, token ring configuration, or other configurations. Furthermore, the network 290 may include a local area network (LAN), a wide area network (WAN) (e.g., the Internet), or other interconnected data paths across which multiple devices and/or entities may communicate. In some embodiments, the network may include a peer-to-peer network. The network may also be coupled to or may include portions of a telecommunications network for sending data in a variety of different communication protocols. In some embodiments, the network 290 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, Wi-Fi (infrastructure mode), Wi-Fi (ad-hoc mode), visible light communication, TV white space communication and satellite communication. The network may also include a mobile data network that may include 3G, 4G, 5G, LTE, LTE-V2V, LTE-V2I, LTE-V2X, LTE-D2D, VOLTE, 5G-V2X or any other mobile data network or combination of mobile data networks. Further, the network 290 may include one or more IEEE 802.11 wireless networks.

In some embodiments, the network 290 includes a V2X network (e.g., a V2X wireless network). The V2X network is a communication network that enables entities such as elements of the operating environment to wirelessly communicate with one another via one or more of the following: Wi-Fi; cellular communication including 3G, 4G, LTE, 5G, etc.; Dedicated Short Range Communication (DSRC); millimeter wave communication; etc. As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VOLTE); etc. In some examples, the V2X communications can include V2V communications, Vehicle-to-Infrastructure (V2I) communications, Vehicle-to-Network (V2N) communications or any combination thereof.

Examples of a wireless message (e.g., a V2X wireless message) described herein include, but are not limited to, the following messages: a Dedicated Short Range Communication (DSRC) message; a Basic Safety Message (BSM); a Long-Term Evolution (LTE) message; an LTE-V2X message (e.g., an LTE-Vehicle-to-Vehicle (LTE-V2V) message, an LTE-Vehicle-to-Infrastructure (LTE-V2I) message, an LTE-V2N message, etc.); a 5G-V2X message; and a millimeter wave message, etc.

During operation, occlusion mitigation circuit 210 can receive information from various vehicle sensors 252 to detect and mitigate occlusions. Communication circuit 201 can be used to transmit and receive information between occlusion mitigation circuit 210 and sensors 252, and occlusion mitigation circuit 210 and vehicle systems 258. Also, sensors 252 may communicate with vehicle systems 158 directly or indirectly (e.g., via communication circuit 201 or otherwise).

In various embodiments, communication circuit 201 can be configured to receive data and other information from sensors 252 that can be used, for example, in detecting occlusion events due to vehicle structures (e.g., vehicle structures 126) and generating data objects corresponding to detected occluded objects. Additionally, communication circuit 201 can be used to send the data objects to rendering device 300 for processing and rendering of a graphical visualization, from the data object, representative of the occluded object on a display interface, such as a display of the display and interaction system 274 and/or a display of the rendering device 300.

As alluded to above, memory 208 can be made up of one or more modules, which may be implemented as hardware, software, or a combination thereof and configured to, when executed by processor 206, perform a dedicated task. In the illustrated example of FIG. 2, memory 208 comprises an occlusion estimation module 213, a computation resource evaluation module 216, an image modification module 217, and a data object generation module 218. The The occlusion estimation module 213 be configured to obtain one or more image frames from image sensors 220 and detect occlusion events in the one or more image frames. An occlusion event occurs when one or more objects are occluded from perspective of a driver of the vehicle, for example, due to vehicle structures. Based on detecting an occlusion event, the resource evaluation module 216 may evaluate a metric of computation resources of the occlusion mitigation circuit 210, for example, based on a computation resource score. The image modification module 217 may be configured to modify the one or more image frames based on the metric so to generate data files having a file size that is sufficient to permit data object generation module 218 to process the resulting image frames and generate data objects of occluded objects in real-time. The data object generation module 218 may then execute an ML algorithm on the image frames output from the image modification module 217. The ML algorithm may be trained to classify objects contained in image frames and generate a label for each of the detected occluded objects. The data object generation module 218 may generate a data object for the occluded object that comprises a graphical element representative of the occluded object and a generated label. The data object can be provided to the rendering device 300 via the communication circuit 201. Additional details of the functionality is provided below in connection with FIG. 4-6G.

Figure 3:
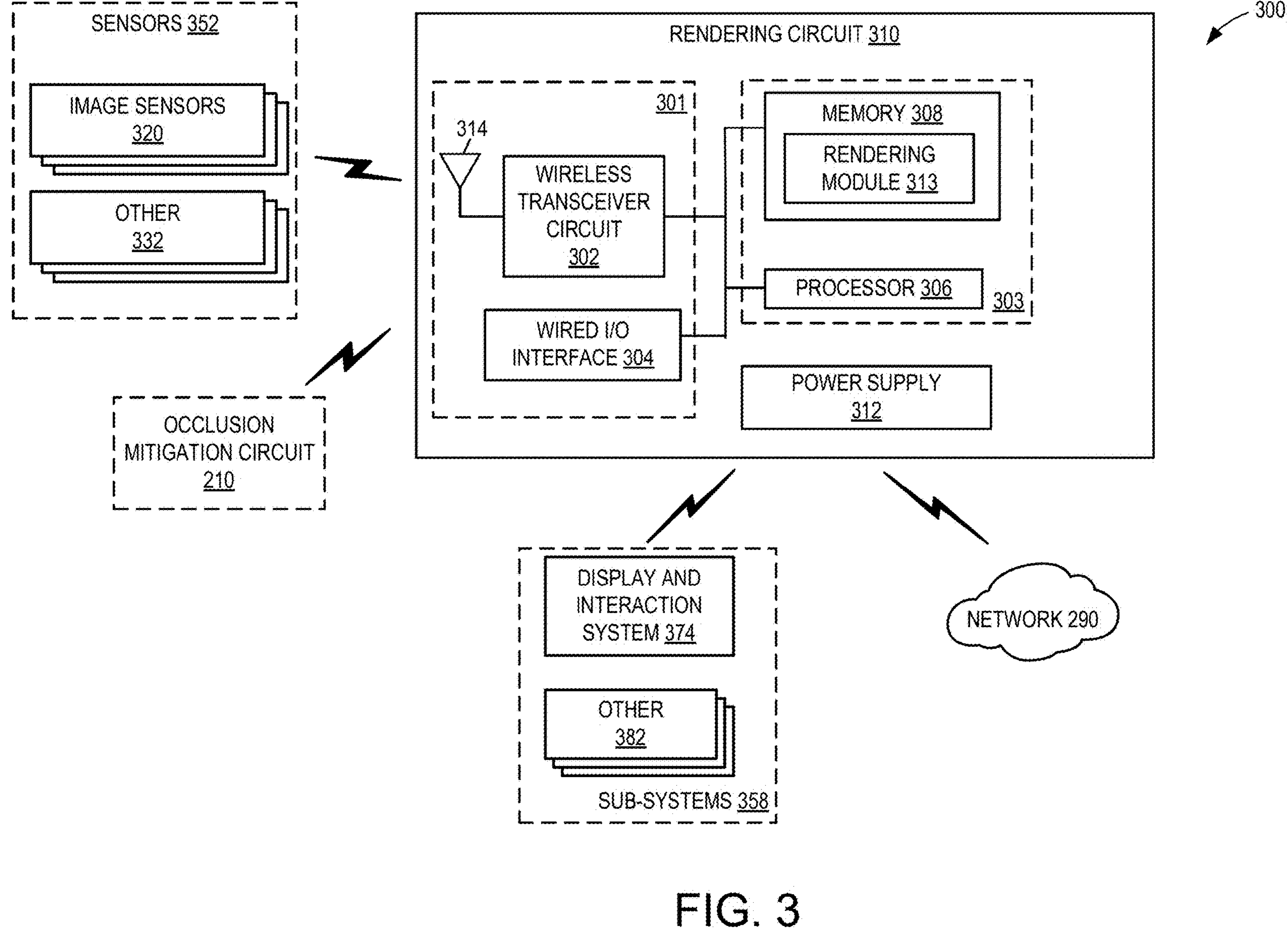
FIG. 3 illustrates an example architecture for a rendering device in accordance with one embodiment of the systems and methods described herein.

FIG. 3 illustrates an example architecture for a rendering device in accordance with one embodiment of the systems and methods described herein. Referring now to FIG. 3, in this example, rendering device 300 includes a rendering circuit 310, a plurality of sensors 352 and a plurality of systems 358. Sensors 352 and systems 358 can communicate with rendering circuit 310 via a wired or wireless communication interface. In some examples, rendering device 300 can be implemented as an AR device such as, for example wearable AR glasses or other AR device. In other embodiments, rendering device 300 can be implemented as a display interface of the display and interaction system 274 of FIG. 2.

Rendering circuit 310 in this example includes a communication circuit 301, a decision circuit 303 (including a processor 306 and memory 308 in this example) and a power supply 312. Components of rendering circuit 310 are illustrated as communicating with each other via a data bus, although other communication in interfaces can be included. Rendering circuit 310 in this example also can be operated to connect to cloud server 285 over network 290, as well as the occlusion mitigation circuit 210 to obtain data objects of occluded objects.

Processor 306 can include one or more GPUs, CPUs, microprocessors, or any other suitable processing system. Processor 306 may include a single core or multicore processors. The memory 308 may include one or more various forms of memory or data storage (e.g., flash, RAM, etc.) that may be used to store instructions and variables for processor 306 as well as any other suitable information, such as, data objects of occluded objects. Memory 308 can be made up of one or more modules of one or more different types of memory, and may be configured to store data and other information as well as operational instructions that may be used by the processor 306 to occlusion mitigation circuit 210. For example, in the illustrative example of FIG. 3, memory 308 comprises a rendering module 313 configured to render one or more data objects, received from the occlusion mitigation circuit 210, on a display interface of the rendering device 300. By rendering the data object, a graphical visualization of the occluded object can be presented to a driver viewing the display interface, thereby perceiving an object that is otherwise occluded by vehicle structures.

Although the example of FIG. 3 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up a rendering circuit 310.

Communication circuit 301 includes either or both a wireless transceiver circuit 302 with an associated antenna 314 and a wired I/O interface 304 with an associated hardwired data port (not illustrated). Communication circuit 301 can provide for communication capabilities, allowing rendering circuit 310 to communicate with edge devices, such as occlusion mitigation circuit 210 via network 290.

As this example illustrates, communications with rendering circuit 310 can include either or both wired and wireless communications circuits 301. Wireless transceiver circuit 302 can include a transmitter and a receiver (not shown) to allow wireless communications via any of a number of communication protocols such as, for example, Wi-Fi, Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 302 to transmit radio signals wirelessly to wireless equipment with which it is connected and to receive radio signals as well. These RF signals can include information of almost any sort that is sent or received by rendering circuit 310 to/from other entities such as sensors 352 and systems 358.

Wired I/O interface 304 can include a transmitter and a receiver (not shown) for hardwired communications with other devices. For example, wired I/O interface 304 can provide a hardwired interface to other components, including sensors 352 and systems 358. Wired I/O interface 304 can communicate with other devices using Ethernet or any of a number of other wired communication protocols whether standardized, proprietary, open, point-to-point, networked or otherwise.

Power supply 312 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

In the illustrated example, sensors 352 may include image sensors 320. Additional sensors 232 can also be included as may be appropriate for a given implementation of rendering device 300, such as, but not limited to, accelerometers, environmental sensors (e.g., to detect salinity or other environmental conditions), and proximity sensor.

Systems 358 can include any of a number of different components or subsystems used to control or monitor various aspects of the rendering device and its performance. In this example, the systems 358 includes a display and interaction system 374 (e.g., audio system for broadcasting notifications over one or more speakers, display system including displays (e.g., LCD, OLED, and the like), and other systems 382. Display and interaction system 374 may include display interfaces, such as display screens. In some examples, rendering device 300 may be implemented as AR glasses comprising lens through which a user can view a real-world environment. The lenses may comprise display interfaces that can render digital content (e.g., data objects) as graphical visualization superimposed on the real-world environment.

During operation, rendering circuit 310 can receive information from occlusion mitigation circuit 210, such as data objects from data object generation module 218. Communication circuit 301 can be used to receive such information, which rendering module 313 can render via display and interaction system 374. Said another way, communication circuit 301 can receive data objects from occlusion mitigation circuit 210 and transmit the data objects to the rendering module 313. Rendering module 313 can be executed by processor 306 to render the data objects on a display interface of system 374, thereby generating a graphical visualization of occluded objects that the driver can perceive via the display interface of the rendering device 300.

Figure 4:
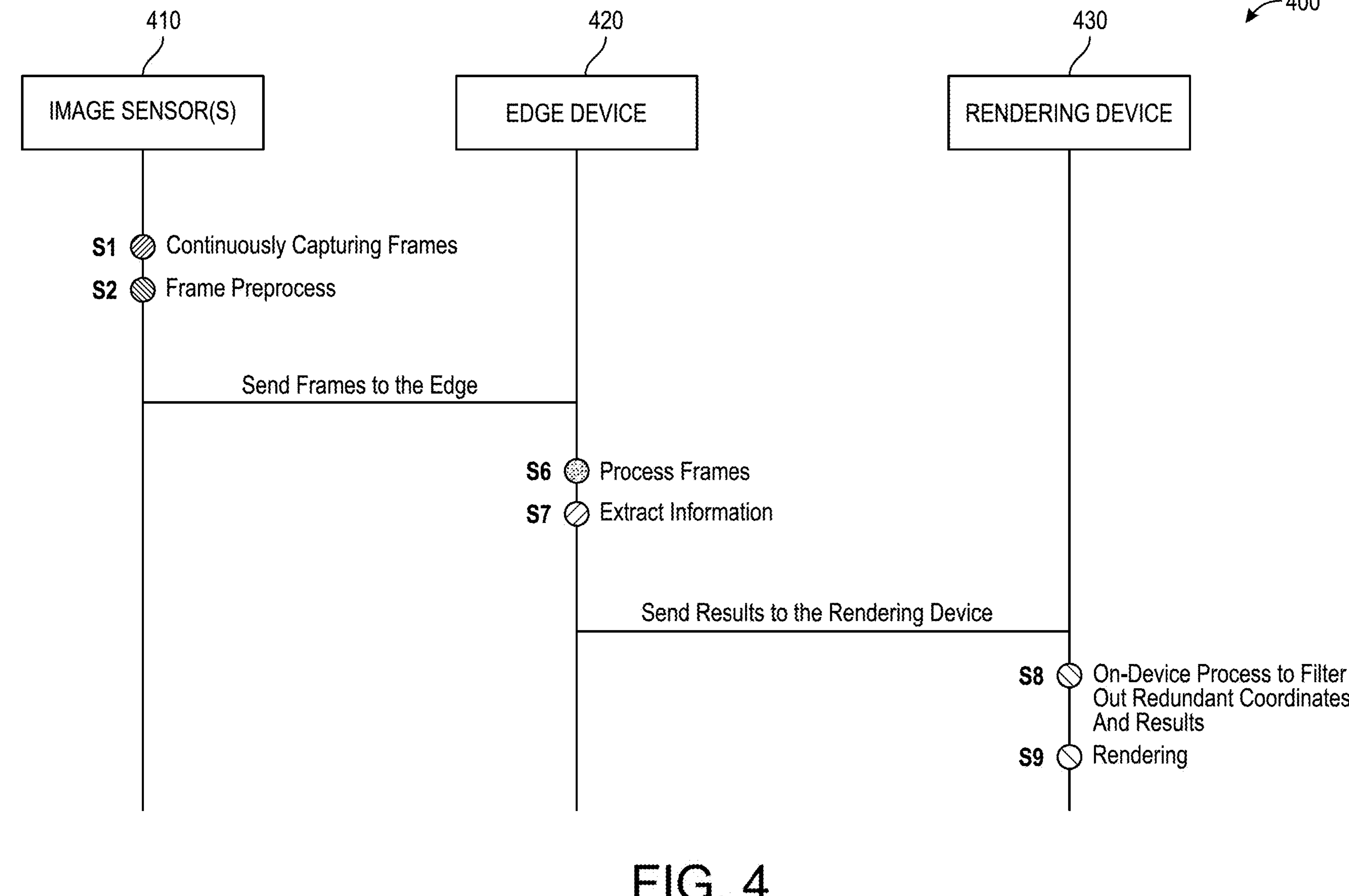
FIG. 4 is a message flow illustrating example operations for occlusion mitigation in accordance with various embodiments disclosed herein.

FIG. 4 is a message flow illustrating example operations for occlusion mitigation in accordance with various embodiments disclosed herein. FIG. 4 provides a flow 400 for mitigating LoS occlusions induced by vehicle structures as described above. The flow 400 involves one or more image sensors 410 (e.g., image sensors 112 and/or 220) configured to capture image frames of an environment surrounding a vehicle (e.g., vehicle 100), an edge device 420 (e.g., controller 110 and/or occlusion mitigation circuit 210), and a rendering device 430 (e.g., rendering device 300). Edge device 420 may be implemented as part of a vehicle (e.g., vehicle 100) or as a separate edge device (e.g., RSU, mobile phone, or the like) communicably connected to the image sensors 410 and rendering device 430.

In flow 400, image sensors can continuously capture image frames of an environment surrounding the vehicle at S1. The image frames can be preprocessed at S2 and sent to the edge device 420.

The edge device 420 receives each image frames and processes the image frames (S6) to extract useful information (S7) what can be sent to the rendering device 430. In an example, processing the image frames at S6 may include processing the image frames to detect an occlusion event in which an object is occluded along a LOS of a driver of the vehicle. For example, projection-based occlusion estimation can be performed on each image frame to identify an occlusion event in which a driver of the vehicle is unable to perceive an object due to the object being occluded by a vehicle structure (e.g., an A pillar in some examples). Projection-based occlusion estimation may use specifications defining physical dimensions of vehicle structures (e.g., an A pillar or other vehicle structures) to estimate an occluded region on each image frame. Objects contained in the image frames can be detected and tracked using known object detection techniques and algorithms. Based on the objection detection, edge device 420 may track the objects and detect an overlap or intersection between the objects in the image frames and the estimated occluded region. The edge device 420 may detect an occlusion event based on (e.g., in response to) detecting such an occurrence. Said another way, edge device 420 can determine that the driver is unable to perceive the tracked object (e.g., an occluded object) in the occluded region due to the vehicle structure.

Once an occlusion event is detected, edge device 420 may be configured to processes the one or more image frames to extract information defining the occluded object. For example, object detection algorithms described above may utilize bounding boxes overlaid on each object contained in the image frames. The bounding boxes corresponding to objects determined to be occluded may be associated with the detected object. A bounding box element, which may be information defining a bounding box, may contain location information (e.g., pixel locations) of the bounding box within the image frame. At S7, edge device 420 may extract the information defining the bounding box (e.g., bounding box element), including the location thereof on each image frame, for each occluded object in the respective image frame.

Additionally, edge device 420 may utilize ML algorithms, such as known object recognition algorithms trained to recognize objects in an image, classify the objects, and generate labels for the classified objects. For each occluded object, the edge device 420 may generate a corresponding label and associate the label with the bounding box element. Using this information, the edge device 420 can construct a data object that includes both the bounding box element and the label. The resulting data object for each occluded object can then be sent to the rendering device 430.

While the above example was described with reference to a bounding box, embodiments herein are not intended to be limited to only bounding boxes, which are provided for illustrative purposes. Any other graphical elements may be generated that can be representative of occluded objects and locations within a given image frame.

At the rendering device 430, the received data objects can be processed at S8 to filter out redundant objects and coordinates. Once filtered, the data objects can be rendered on a display interface of the rendering device at S9. Rendering the data objects may include generating a graphical visualization of the data object, representative of the occluded object, which is superimposed on a real-world view of the environment as perceived by the driver. For example, the rendering device 430 may be an AR device (e.g., AR glasses or other AR enabled device) configured to overlay the data object, as graphical visualization, onto a real-world view of the environment surrounding the vehicle. In this case, the real-world view may be from the view point of the driver, which may include perceiving the vehicle structure that induced the occlusion detected above. Rendering the data object may include overlaying a graphical visualization of the data object on this real-world view, for example, overlaid on the vehicle structure. As a result, the driver can be notified of an object that is otherwise occluded and is able to perceive the location of this occluded object.

Figure 5:
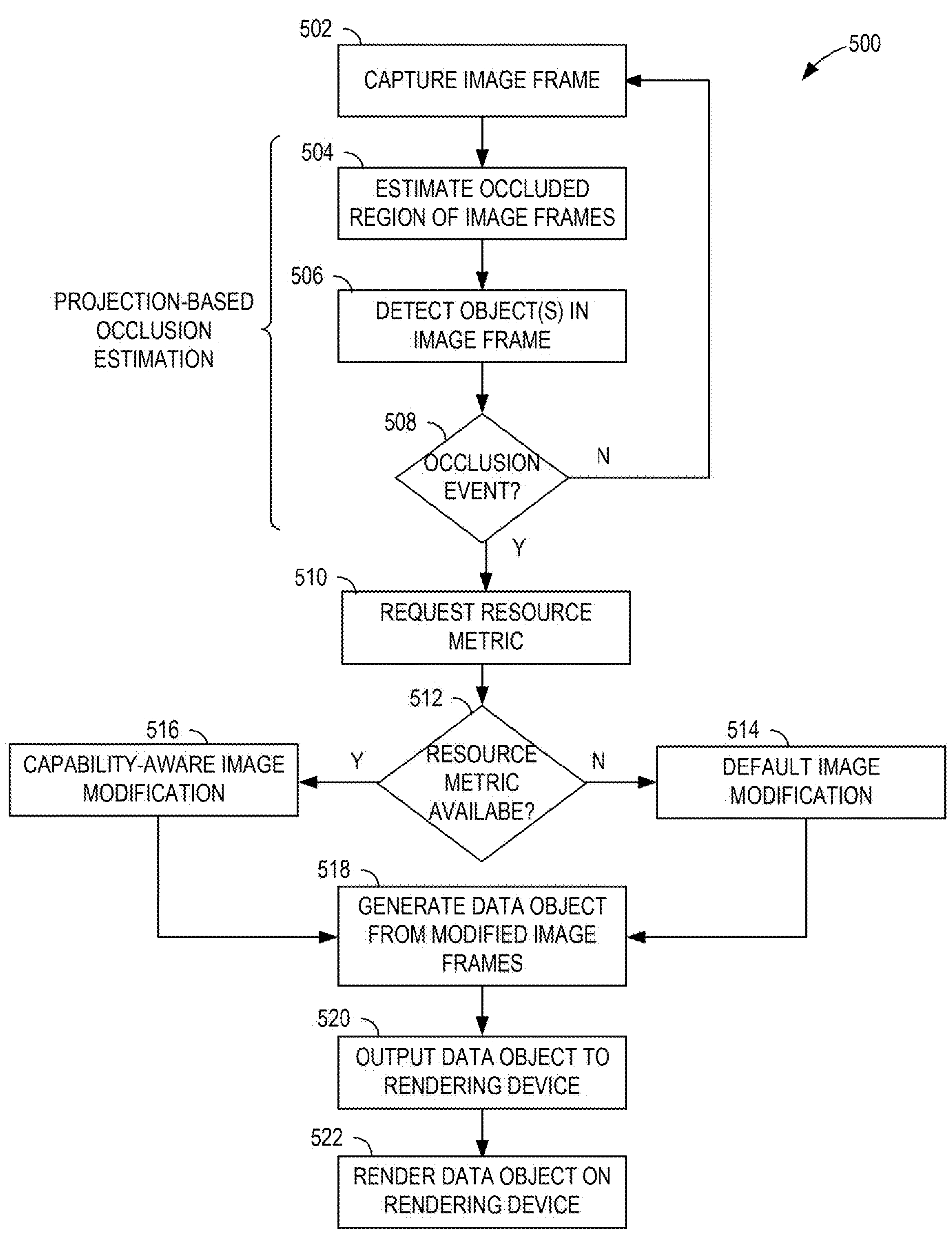
FIG. 5 is a flow chart illustrating example operations for mitigation occlusions in accordance with various embodiments disclosed herein.

FIG. 5 is a flow chart illustrating example operations for mitigation occlusions in accordance with various embodiments disclosed herein. Process 500 may be implemented as instructions, for example, stored on an occlusion mitigation circuit (e.g., occlusion mitigation circuit 210) and/or a rendering device (e.g., rendering device 300), that when executed by one or more processors perform one or more operations of process 500. The process 500 will be described below with reference to FIGS. 6A-6G as illustrative examples. FIGS. 6A-6G depict schematic diagrams of image frames and data elements that can be utilized and/or generated during the operations of process 500. One skilled in the art will appreciate that the embodiments disclosed herein are not to be limited to the example schematic shown in FIGS. 6A-6G.

Figures 6A, 6B, 6C, 6D:
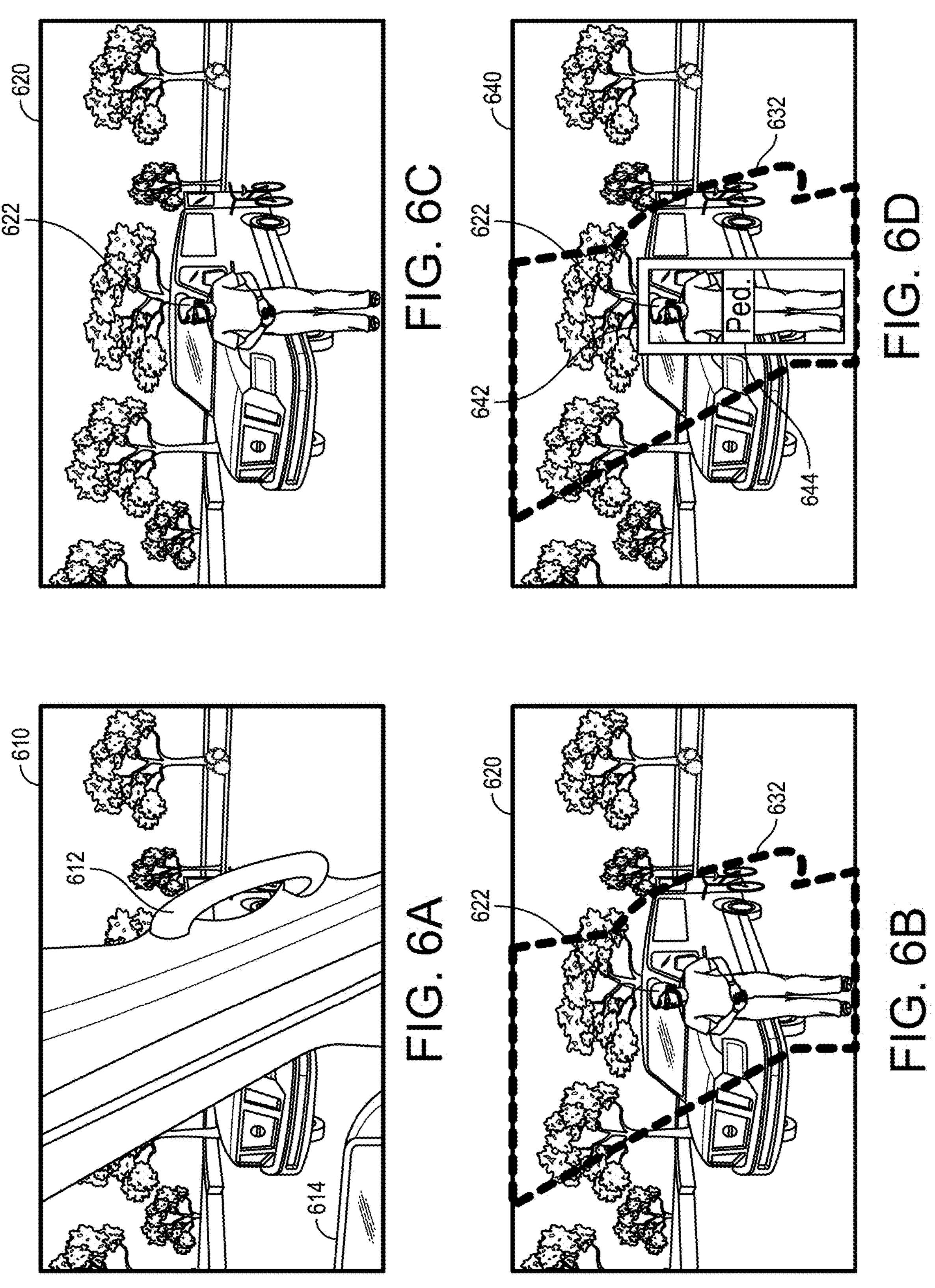
FIG. 6A illustrates an example real-world view of an environment from the view point of a driver of a vehicle in accordance with one described herein.
FIG. 6B illustrates an example image frame obtained by an image sensor in accordance with one described herein.
FIG. 6C illustrates an example occluded region of the image frame of FIG. 6B estimated based on a vehicle structure in accordance with one described herein.
FIG. 6D illustrates an example of object recognition and classification implemented on an image frame in accordance with one described herein.

At operation 502, an image frame of an environment surrounding a vehicle is captured, for example, by an image sensor (e.g., image sensor 112A and/or 220). The image sensor may be an exterior mounted or otherwise exterior facing image sensor configured to capture images frames of an environment surrounding a vehicle (e.g., vehicle 100) that is communicably connected to the occlusion mitigation circuit. For example, FIG. 6A illustrates a real-world view 610 of the environment from the view point of a driver (not shown) of the vehicle, while FIG. 6B illustrates an example an example image frame 620 that can be obtained at operation 502. In the examples of FIGS. 6A and 6B, image frame 620 comprises a pedestrian 622 that is occluded from the view of the driver, as shown in FIG. 6Am, due to A pillar 612 (e.g., A pillar 126A). In the examples of FIG. 6B, the image sensor may be mounted on an exterior facing side of the A pillar 612. In another example, the image sensor may be mounted elsewhere on the vehicle, such as on the side-mirror 614, front end of a bumper, front end of fender, etc.

Process 500 may executed projection-based occlusion estimation to detect the occlusion event, such as, pedestrian 622 being occluded by A pillar 612 along a LoS of the driver. Projection-based occlusion estimation in this example includes operations 504 and 506. While FIG. 5 depicts an example sequence in which operation 504 precedes operation 506, embodiments herein are not limited to the depicted order. The operations can be performed in any desired order, as well as in parallel as desired.

At operation 504, an occluded region of the image frame can be estimated that corresponds to a region of the image frame would be blocked or otherwise occluded by the vehicle structure from the view point of the driver. FIG. 6C illustrates an example occluded region 632 of image frame 620 that can be estimated based on the A pillar 612. In some examples, estimating the occluded region 632 comprises generating a projection of the vehicle structure (e.g., A pillar 612) based on the dimensions of the vehicle structure and a relative orientation alignment between a position of the driver's head and an optical axis of the image sensor. For example, specifications may be stored or otherwise obtained that define the physical dimensions of the A pillar 612. A position of the driver's head relative to the A pillar 612, which may be predetermined, can be used to determine a projection of A pillar 612 onto the image frame. For example, a location of the A pillar in a real-world coordinate system can be determined based on an predicted or otherwise assumed position of the driver's head while operating the vehicle. In some embodiments, sensors (e.g., accelerometers and localization sensor) on a rendering device (e.g., AR glasses) may provide position information of the driver's head for a real-time up-to-date head position relative to the A pillar 612. An offset between the optical axis of the image sensor and a direction of the driver's LoS to the real-world view 610 can be determined. This offset can be used to translate the real-world location of the A pillar to a coordinate system of the image frame 620. Using the translated coordinate system, the dimensions of the A pillar 612 can be translated to the coordinate system of the image frame 620 and used to generate projection of the A pillar 612. In the example of FIG. 6C, the projection may be overlaid on the image frame 620 to define the occluded region 632.

At operation 506, objects contained in the image frame can be detected, for example, using known object detection algorithms. In some examples, object detection may be performed at the image sensor itself, which may execute object detection algorithms. In another example, the object detection may be performed at the occlusion mitigation circuit. In some examples, object detection may comprise detecting objects and constructing a bounding box around the detected object that can be used to track the object between image frames. Detecting objects may include identifying pixel information (e.g., pixels of image frame 620) associated with any detected objects and constructing the bounding box. Similarly, the estimated occluded region may be provided as pixel information corresponding to the location of the occluded region 632 on the image frame.

At operation 508, a determination is made as to whether or not an occlusion event is present in the image frame. For example, operation 508 may detect an intersection or overlap between objects detected at operation 506 and the occluded region estimated at operation 506. In an example, pixel information of the detected objects can be compared with the pixel information of the estimated occluded region to detect an intersection or overlap thereof. FIG. 6C illustrates such an overlap in which the object 622 lays entirely withing the occluded region 632. If the determination is negative, process 500 may return to operation 502 to analyze a next image frame captured by the image sensor.

Based on detecting an occlusion event, a determination can be made as to whether to execute a capability-aware image modification or a default image modification. For example, at operation 510 a metric of computation resources of the occlusion mitigation circuit can be queried, for example, from a cloud-based database that stores such metrics and the determination can be made based on a metric obtained based on the query. Modifying the image frame may include resizing the one or more image frame to generate smaller file sizes for each image frame. For example, the resolution of each image frame may be reduced to provide a smaller file size that can be efficiently processed by downstream operations. In another example, modifying the image frame may comprise removing or otherwise deleting unnecessary metadata or image data. For example, the image frame may be a RGB image frame, which can be converted to grayscale or black-and-white to reduce the data size by removing certain pixel information. Other techniques may be used to modify the image frames to reduce the file size.

If the metric is not available (e.g., if the occlusion mitigation circuit is new or otherwise unknown), then operation 514 applies default image modification to the image frame. The default image modification may be set in advance and selected to ensure that processing of the image frames can be achieved in real-time irrespective of the computation resources of the occlusion mitigation circuit. In some examples, default image modification may be implemented as a fixed-ratio resizing of the one or more images, where "fixed-ratio" refers to ratio that is common across edge devices having a common day level of computation resources so to achieve real-time processing. In an example, the fixed-ratio resizing may be set to 20:1, but other any ratio as desired may be implemented.

If a metric is available, process 500 proceeds to operation 516 and applies capability-aware image modification, which uses the metric of the computation resources to dynamically select a magnitude of the modification (e.g., a dynamic ratio). For example, the magnitude of the modification to each image frames may be determined based on the metric of the computation resource so to ensure real-time image processing (e.g., recognition and classification) and rendering of the data objects in real-time. In examples, processing the images in real-time may be include, for example, executing operations 518-522 described below. The set amount of time may be, for example, 30 milliseconds or less, or 16 milliseconds or less. Any set amount of time may be selected, such that there is negligible delay (e.g., no perceivable delay by the driver of the vehicle) between obtaining the image frame at operation 502 and rendering data objects at operation 522.

In some examples, the metric can be based on a computation resource score for the occlusion mitigation circuit. For example, a computation resource score may be obtained that is representative of a measure of total computation resources of the occlusion mitigation circuit. In the case of a vehicle, for example, the vehicle may be preconfigured with certain computation resources, such as but not limited to, total amount of processing power, a total amount of memory, various computing components (e.g., GPU, CPU, etc.) that define the computation resources of the vehicle. Each computation resource can be allocated a value corresponding to the amount of each respective resource (e.g., larger values allocated to larger amounts of resources). A weight may be applied to each value and the weighted values may be aggregated to provide the computation resource score. In some examples, the computation resource score may be known in advance and stored in a cloud-database, which can be communicated to the occlusion mitigation circuit. In some examples, the metric of computation resources can be provided as the computation resource score.

In other examples, the metric of computation resources may comprises an available computation resource score. For example, the computation resource score can be obtained, as described above, and compared to a score of computation resource committed to other tasks (referred to herein as committed resource score). The committed resource score can be subtracted from the computation resource score to determine the available computation resource score.

In some examples, operation 516 may determine whether to modify the image frame or not based on the metric of computation resources. For example, a metric threshold may be set. The metric threshold may be selected at a level that ensure real-time processing of the image frame (e.g., minimum threshold computation resources needed for real-time operation). If the metric is equal to or greater than the metric threshold, operation 516 need not modify the image frame because the computation resources of the occlusion mitigation circuit are sufficient for real-time operation. If the metric is below the metric threshold, then the image frame may be dynamically modified based on the metric, where the magnitude of the modification is selected to ensure that the computation resources can process the image frame in real-time.

At operation 518, the resulting image frame from operations 516 or 514 can be processed to generate a data object representative of the occluded object detected at operation 508. For example, operation 518 may include executing an ML algorithm trained for object recognition and classification. The ML algorithm may be applied to the resulting image frame to classify the occluded object from operation 508 and generate a label of the classification.

FIG. 6D illustrates an example of object recognition and classification implemented on an image frame 640. Image frame 640 may be an image frame 620 resulting from operations 516 or 514. In the example of FIG. 6D, operation 518 classifies the occluded object 622 as a pedestrian ("Ped.") and generates label 644, which is illustratively shown as overlaid on the occluded object. FIG. 6D also depicts a bounding box 642, which may be generated by the object recognition executed at operation 518 or generated by the object detection at operation 506. The bounding box 642 may be provided as pixel information (e.g., a color value and locations within the image frame) that defines a bounding box element.

Operation 518 may extract a data object corresponding to the detected occluded object from the image frame resulting from operations 516 or 514. The data object may be constructed from one or more graphical elements and label generated at operation 518. The graphical element, in various examples, may comprise the bounding box 642. For example, FIG. 6E depicts an example data object 650*a* that can be extracted from image frame 640. Data object 650*a*, in this example, comprises the bounding box 642 and label 644, which operation 518 extracts from the image frame 640. FIG. 6F depicts another example data object 650*b* that can be extracted from image frame 640. In this example, data object 650*b* comprises graphical elements comprising the bounding box 642 and an avatar 646 (e.g., a graphical representation of the occluded object), along with the label 644. The avatar 646 may be a 2D icon, outline, skeleton, or other representation of the object 622. In some examples, the avatar 646 may be the object 622 itself extracted from the image frame 640. In some examples, data object 650*b* need not include the bounding box 642. While certain examples are provided herein, embodiments are not limited to the specific examples of data objects. Any graphical element representative of the occluded object may be used to construct the data object.

At operation 520, the data object generated at operation 518 can be output to a rendering device (e.g., rendering device 300).

At operation 522, the data object can be rendered on a display interface of the rendering device viewable by the driver of the vehicle. Operation 522 may include overlaying the data object on a real-world view of the environment as perceived by the driver. For example, the rendering device according to some embodiments may be an augmented reality (AR) device that can overlay the data object, as a graphical visualization, onto a real-world view of environment. In this case, the real-world view may be from the view point of the driver, which may include perceiving the vehicle structure that induced the occlusion detected above. For example, FIG. 6G illustrates an example of graphical visualization 664 of the data object 650*a* (or data object 650*b*) overlaid on a real-world view 660 via rendering device 662 (e.g., AR glasses worn by the driver in this example). In the illustrated example of FIG. 6G, the graphical visualization 664 rendered on a display interface of rendering device 662 at locations corresponding to the real-world location of the occluded object 622 so to be overlaid on the A pillar 612 in the display interface. As a result, the driver can visually perceive the occluded object 622 as the graphical visualization 664.

While the example shown in FIG. 6G is described as AR glasses, embodiments disclosed herein are not limited to AR glasses. Any display interface may be implemented as desired. For example, the rendering device may comprise a heads-up display, dashboard display, center console display, infotainment display, display screen of mobile phone, or the like.

Figure 7:
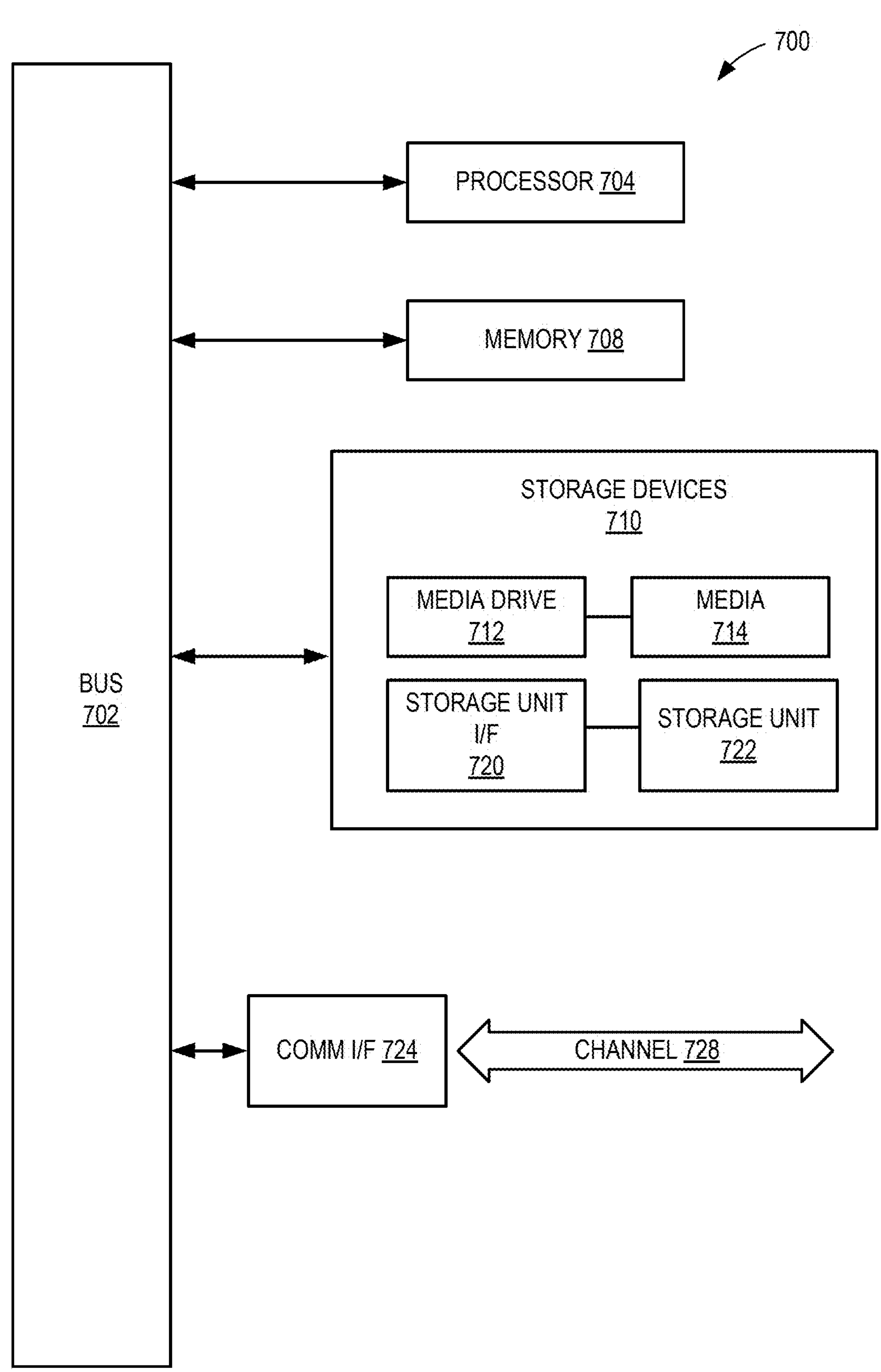
FIG. 7 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up vehicle 100 of FIG. 1, occlusion mitigation system 200 of FIG. 2, and/or rendering device 300 of FIG. 3. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 may store instructions, that when executed by processor 704, perform one or more operations described in connection with FIGS. 4 and/or FIG. 5. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 722, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:

obtaining an image frame captured by an image sensor in a vehicle;

estimating a region of the image frame occluded from view of an occupant of the vehicle by a structure of the vehicle;

detecting an object in the image frame using an object detection algorithm;

responsive to determining that the detected object at least partially overlaps with the estimated region, detecting an occlusion event associated with the structure of the vehicle occluding the object from the view of the occupant of the vehicle;

modifying the image frame;

generating a data object representative of the occlusion event from the modified image frame; and outputting the data object to a rendering device, wherein the rendering device renders a graphical visualization of the data object on a display viewable by the occupant of the vehicle.

2. The method of claim 1, wherein estimating the region of the image frame occluded by the vehicle is based on dimensions of a vehicle structure of the vehicle, a position of the occupant within the vehicle, and an orientation of the image sensor.

3. The method of claim 1, wherein the object is occluded by a vehicle structure comprising at least one of: an A pillar of the vehicle, a B pillar of the vehicle, a C pillar of the vehicle, a side-mirror of the vehicle, a rear-view mirror, or sun visor.

4. The method of claim 1, wherein modifying the image frame is responsive to detecting the occlusion event.

5. The method of claim 1, further comprising:

dynamically selecting a magnitude of modification based on evaluating a metric of the computation resources of the vehicle, wherein modifying the image frame is based on the selected magnitude of the modification.

6. The method of claim 1, wherein generating the data object representative of the occlusion event comprises:

extracting a graphical element representative of the object from the modified image frame; and generating a label for the object by applying a machine learning (ML) object recognition algorithm trained to classify objects and generate labels based on the classifications, wherein the data object comprises the graphical element and the label.

7. The method of claim 6, wherein the graphical element comprises a bounding box corresponding to the object.

8. The method of claim 6, wherein the rendering device comprises an augmented reality (AR) device configured to render the graphical visualization of the data object by superimposing the graphical element and the label over a real-world view on a display interface of the AR device.

9. An edge device, comprising:

memory storing instructions; and one or more processors communicably coupled to the memory and configured to execute the instructions to:

obtain an image frame captured by an image sensor in a vehicle, the image frame comprising an object in an environment surrounding the vehicle;

detect that the object is occluded from view of an occupant of the vehicle by a structure of the vehicle;

determine a computation resource score for the edge device and determine a magnitude of modification for the image frame based on the computation resource score;

modify the image frame in accordance with the determined magnitude of modification;

generate a data object representative of the occluded object from the modified image frame; and transmit the data object to a rendering device, wherein the rendering device renders a graphical visualization of the data object on a display viewable by the occupant of the vehicle.

10. The edge device of claim 9, wherein detecting that the object is occluded from the view of the occupant of the vehicle comprises:

estimating an occluded region of the image frame based on the structure of vehicle; and detecting that the object at least partially overlaps with the occluded region, wherein detecting that the object is occluded is responsive to the detection that the object at least partially overlaps with the occluded region.

11. The edge device of claim 10, wherein estimating the occluded region is based on dimensions of a vehicle structure of the vehicle, a position of the occupant within the vehicle, and an orientation of the image sensor.

12. The edge device of claim 9, wherein the structure of the vehicle comprises at least one of: an A pillar of the vehicle, a B pillar of the vehicle, a C pillar of the vehicle, or a side-mirror of the vehicle.

13. The edge device of claim 9, wherein modifying the image frame is responsive to detecting the occlusion event.

14. The edge device of claim 9, wherein generating the data object representative of the occluded object comprises:

extracting a graphical element of the object from the modified image frame; and generating a label for the object by applying a machine learning (ML) object recognition algorithm trained to classify objects and generate labels based on the classifications, wherein the data object comprises the graphical element and the label.

15. The edge device of claim 14, wherein the graphical element comprises a bounding box corresponding to the object.

16. The edge device of claim 14, wherein the rendering device comprises an augmented reality (AR) device configured to render the graphical visualization of the data object by superimposing the graphical element and the label over a real-world view on a display interface of the AR device.

17. The edge device of claim 9, wherein the edge device is the vehicle.

18. The edge device of claim 9, wherein the image sensor is mounted on an exterior facing surface of the structure of the vehicle.

19. The edge device of claim 9, wherein determining the computation resource score for the edge device and determining the magnitude of modification for the image frame based on the computation resource score comprises:

responsive to a query result indicating no existing computation resource score is available for the edge device, determining a default modification for the image frame.

20. The edge device of claim 19, wherein the default modification for the image frame comprises a fixed-ratio resizing of the image frame that is common across edge devices having a common day level of computation resources.

* * * * *